United States Patent
Wafzig et al.

[19]

[11] Patent Number: 6,012,345
[45] Date of Patent: Jan. 11, 2000

[54] METHOD FOR CHANGING GEARS OF A MULTIPLE GEAR MANUALLY SHIFTABLE CHANGE GEAR UNIT FOR COMMERCIAL VEHICLES

[75] Inventors: Jürgen Wafzig, Eriskirch; Hans-Jörg Domian, Immenstaad, both of Germany

[73] Assignee: ZF Friedrichshafen AG, Friedrichshafen, Germany

[21] Appl. No.: 09/208,227

[22] Filed: Dec. 9, 1998

[30] Foreign Application Priority Data

Dec. 10, 1997 [JP] Japan ................................ 197 54 726

[51] Int. Cl.$^7$ ..................................................... F16H 61/08
[52] U.S. Cl. ..................................................... 74/50; 74/335
[58] Field of Search ....................................... 74/335, 745

[56] References Cited

U.S. PATENT DOCUMENTS 4,802,384  2/1989  Schwarz et al. .......................... 74/745
5,946,972  9/1999  Palmeri ..................................... 74/335

FOREIGN PATENT DOCUMENTS

| 0 214 989 B1 | 3/1987 | European Pat. Off. . |
| 31 33 067 C2 | 3/1983 | Germany . |
| 36 19 329 A1 | 1/1987 | Germany . |
| 40 20 558 A1 | 1/1991 | Germany . |
| 42 34 572 A1 | 4/1994 | Germany . |

*Primary Examiner*—Dirk Wright
*Attorney, Agent, or Firm*—Davis and Bujold

[57] ABSTRACT

The method for changing the gears of a manually shiftable change gear unit for commercial vehicles which has a main gear unit and fitted downstream thereof a combination of splitter gear unit and range gear unit wherein when shifting the individual gear units from the coupling position (1) to the neutral position (0), in time are first shifted the main gear unit, then the splitter gear unit and finally the range gear unit and conversely, when shifting form the neutral position (0) to the coupling position (1), in time first the range gear unit, then the splitter gear unit and finally the main gear unit are shifted.

3 Claims, 5 Drawing Sheets

4*2*2

| $i_{11}$ | $i_{12}$ | $i_{13}$ | $i_{14}$ | $i_{15}$ | $i_{16}$ | $i_{17}$ | $i_{18}$ |
|---|---|---|---|---|---|---|---|
| 1,772 | 1,209 | 0,826 | 0,564 | 1,635 | 1,351 | 0,294 | max. |

Fig. 3c

| Gear | A | B | C | D | E | F | G | H | K | u |
|---|---|---|---|---|---|---|---|---|---|---|
| 1L | x |   |   |   | x |   |   | x |   | 17,47 |
| 1H | x |   |   |   |   |   | x | x |   | 14,44 |
| 2L |   | x |   |   | x |   |   | x |   | 11,94 |
| 2H |   | x |   |   |   |   | x | x |   | 9,85 |
| 3L |   |   | x |   | x |   |   | x |   | 8,14 |
| 3H |   |   | x |   |   |   | x | x |   | 6,73 |
| 4L |   |   |   | x | x |   |   | x |   | 5,56 |
| 4H |   |   |   | x |   |   | x | x |   | 4,60 |
| 5L | x |   |   |   | x |   | x |   |   | 3,80 |
| 5H | x |   |   |   |   |   | x | x |   | 3,14 |
| 6L |   | x |   |   | x |   | x |   |   | 2,60 |
| 6H |   | x |   |   |   |   | x | x |   | 2,14 |
| 7L |   |   | x |   | x |   | x |   |   | 1,77 |
| 7H |   |   | x |   |   |   | x | x |   | 1,47 |
| 8L |   |   |   | x | x |   | x |   |   | 1,21 |
| 8H |   |   |   | x |   |   | x | x |   | 1,00 |
| RL |   |   |   |   | x |   |   | x | x | max. |
| RH |   |   |   |   |   | x |   | x | x | max. |

| $i_{11}$ | $i_{12}$ | $i_{13}$ | $i_{14}$ | $i_{15}$ | $i_{16}$ | $i_{17}$ | $i_{18}$ |
|---|---|---|---|---|---|---|---|
| 1,772 | 1,209 | 0,826 | 0,564 | 1,117 | 1,351 | 0,294 | max. |

Fig. 4c

| Gear | A | B | C | D | E | F | G | H | K | u |
|---|---|---|---|---|---|---|---|---|---|---|
| 1L | x |   |   |   |   | x |   | x |   | 14,44 |
| 1H | x |   |   |   | x |   |   | x |   | 11,94 |
| 2L |   | x |   |   |   | x |   | x |   | 9,85 |
| 2H |   | x |   |   | x |   |   | x |   | 8,14 |
| 3L |   |   | x |   |   | x |   | x |   | 6,73 |
| 3H |   |   | x |   | x |   |   | x |   | 5,56 |
| 4L |   |   |   | x |   | x |   | x |   | 4,60 |
| 4H |   |   |   | x | x |   |   | x |   | 3,80 |
| 5L | x |   |   |   |   | x | x |   |   | 3,14 |
| 5H | x |   |   |   | x |   | x |   |   | 2,60 |
| 6L |   | x |   |   |   | x | x |   |   | 2,14 |
| 6H |   | x |   |   | x |   | x |   |   | 1,77 |
| 7L |   |   | x |   |   | x | x |   |   | 1,47 |
| 7H |   |   | x |   | x |   | x |   |   | 1,21 |
| 8L |   |   |   | x |   | x | x |   |   | 1,00 |
| 8H |   |   |   | x | x |   | x |   |   | 0,83 |
| RL |   |   |   |   |   | x |   | x | x | max. |
| RH |   |   |   |   | x |   |   | x | x | max. |

Fig. 4d

METHOD FOR CHANGING GEARS OF A MULTIPLE GEAR MANUALLY SHIFTABLE CHANGE GEAR UNIT FOR COMMERCIAL VEHICLES

This invention relates to a method for changing gears of a multiple gear manually shiftable change gear unit for commercial vehicles which has a main gear unit and fitted downstream thereof a combination of splitter gear unit and range gear unit.

BACKGROUND OF THE INVENTION

Multiple gear change gear unit, especially those having wide gear spacing, make possible in motor vehicles having internal combustion engines, on the one hand, favorable life and on the other an economic consumption of fuel, since for each operating state it is possible to select a favorable working range of the internal combustion engine. In passenger cars unitary transmissions with four to five gears while in commercial vehicles there are used multiple gear units providing up to eighteen gears.

A transmission of planetary design having a multiple gear main gear unit and a two-gear secondary gear unit designed as splitter gear which in the course of a gear change sequence is shifted once, has been disclosed in EP B1 214 989. With said gear unit five forward gears can be shifted, the gear shift of the gear unit being comparatively easy, since shifting components only have to be actuated either in the main gear unit or in the group gear unit.

From the applicant's DE 42 34 572 has become known a change gear unit of group design in which the ratio steps between the lower gears are larger than between the upper gears and which works in combination with the lower and upper gears as a splitter group gear unit while in combination with the middle gears works as range group gear unit. Here is required in the middle gear range a group gearshift which coincides with a gearshift in the main gear unit so that a special electronic start up is required. According to a special embodiment the gear unit has a planetary design with wheel sets for a six-gear to eight-gear unit.

The applicant's DE 31 33 067 describes a gear shiftable change gear unit which consists of one multiple gear main unit and fitted downstream thereof a splitter group with two input gears of which one is connectable with the input shaft of the gear unit and the other is optionally connectable also with a main shaft of the gear unit. The splitter group forms here a firm component part of the main gear unit and it can be bridged so that the gears of the main unit can be shifted directly to the main shaft by the input shaft by alternate introduction of a double clutch and other separating clutches.

A gear change gear unit which has a main unit situated on the input side, a range group gear unit and a reverse gear unit situated on the output side and is shiftable with the twelve forward gears has been disclosed in the applicant's DE 36 19 329. This change gear unit is adequate for commercial vehicles, for example, agricultural tractors, since it is possible when under load to shift from gear to gear so that even during a change of gear power is uninterruptedly transmitted from the input shaft to the output shaft. This change gear unit is especially well suited to agricultural tractors which, in their main drive speed range (medium drive speeds), are to have a high degree of power utilization (defined as the ratio of the actual power to the highest power) and/or a high working efficiency (defined as the ratio of useful work to fuel consumption) while the degree of usefulness and the degree of efficiency in low and high drive speeds are of less importance.

In such known gear change units, there are situated in a main axle an input shaft, a double clutch, a first intermediate shaft of a first part of a main gear unit, a second intermediate shaft of a second part of the main gear unit and a third intermediate shaft which belongs both to a range group gear unit and to a reverse gear unit. Further provided are two parallel shafts which support a plurality of gears.

In the applicant's DE 40 20 558 is described a multiple gear change gear unit in which between the input group and a main group is situated an intermediate gear unit; this change gear unit, is especially suited to tractors and certain construction vehicles, has a wide range of ratios with many ratio steps which make possible an optimal utilization of the innate engine traction at all drive speeds. In a special development of the intermediate gear unit, it serves as overdrive, having a certain reduction ratio so that high speeds can be achieved without having to give up low speeds for working purposes.

The importance of operating comfort which is function of the shifting force and thus of the shifting stroke to be applied, and noise developed due, for example, to so-called idle speed rattle associated with manually shiftable multiple gear units for trucks, has increased in the last few years and has become increasingly decisive in buyers, purchasers. The quality of a gear change unit, in view of this criteria, has become important in the design of gear units, that is, in the arrangement of the wheels, shafts and shifting components.

A reduction of shifting force and shifting stroke can be achieved by the rotary masses which have to be synchronized during a gearshift operations being as small as possible. The lowest possible noise level at idle speed (slight idle speed rattle) can be obtained by ensuring that rotation irregularities are not introduced in the gear unit.

SUMMARY OF THE INVENTION

The problem on which this invention is based is to provide a method for changing the gear of a multiple gear manually shiftable change gear unit for commercial vehicles in which an improved operating comfort and a low noise level are obtained.

According to the invention there is provided a method for changing the gears of a multiple gear manually shiftable change gear unit for commercial vehicles which has a main gear unit and downstream thereof a combination of splitter gear unit and range gear unit wherein the individual gear units are shifted from a coupling position (1) to a neutral position (0) in time such that first the main gear unit, thereafter the splitter gear unit and finally the range gear unit are shifted, wherein when shifting the gear units from the neutral position (0) to the coupling position (1), they are shifted in time such that first the range gear unit, then the splitter gear unit and finally the main gear unit is shifted The method, according to the invention, is especially adequate for a change gear unit with sixteen forward and two reverse gears which has a multiple gear main gear unit with a combination of splitter and range gear units fitted downstream thereof. The shift diagram basis of the method, according to the invention, allows both a direct gear version and also an overdrive version.

The main gear unit is manually shifted without aid of shifting force augmentation while the downstream fitted splitter and range gear units are changed with power assistance.

The method, according to the invention, for changing the gears in a multiple gear change gear unit offers the following advantages:

- light shifting forces with short shifting strokes;
- equal shifting forces for all normal gearshifts;
- no shifting servo assistance is required;
- use of single cone synchronization systems of reasonable cost;
- no idle speed rattling;
- rattle tendency during travel less than in traditional multiple gear units;
- direct gear and overdrive versions are identical down to a transmission ratio step;
- the arrangement of power take off is simplified; and
- the countershaft of the main gear unit can be shorter than designed in the known multiple gear units.

BRIEF DESCRIPTION OF THE DRAWINGS

The invention will now be described, by way of example, with reference to the accompanying drawings, in which:

FIG. 3C is a tabulated graph of the individual ratio sequences;

FIG. 3D is a table for shifting logic and total ratios for the direct version; and FIG. 4A to FIG. 4D are the same graphs as in FIG. 3A to FIG. 3D for the overdrive version.

DESCRIPTION OF THE PREFERRED EMBODIMENTS

Figure 1:
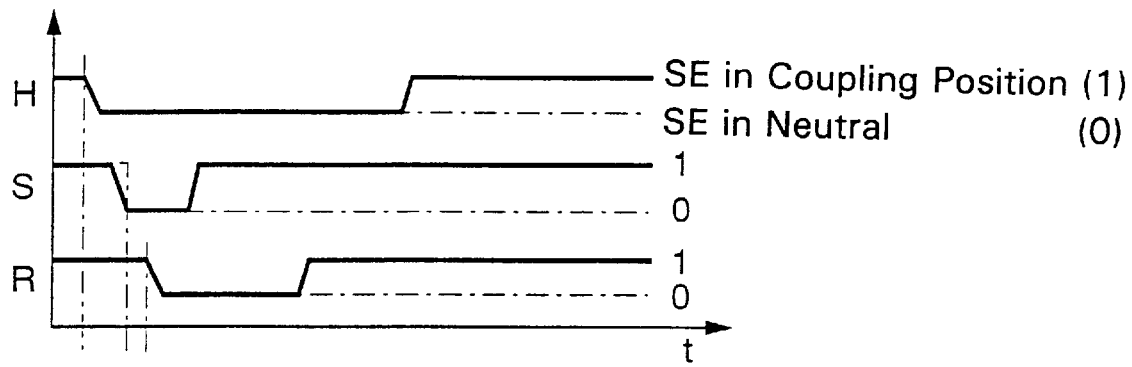
FIG. 1 is the traditional gear change sequence of a change gear unit consisting of main gear unit, splitter and range gear units.

FIG. 1 shows the shifting cycle in traditional prior art change gear units which have a main gear unit, a splitter gear unit and a range gear unit wherein the time sequence of the shift from the coupling position 1 to the neutral position 0 is such that first the main gear unit H, then the splitter gear unit S and finally the range gear unit R are switched and conversely, when shifting from the neutral position 0 to the coupling position 1, first the splitter gear unit S, then the range gear unit R and finally the main gear unit H are shifted.

In this shifting cycle of a change gear unit with splitter and range gear units, strong synchronizing forces and therewith great synchronizing work are needed with a corresponding synchronization system for the range gear unit and corresponding by large shaft spacing.

Figure 2:
FIG. 2 is the gear change sequence of a change gear unit, according to the invention, consisting of main gear unit with a downstream fitted combination of splitter and range gear units.

With shifting cycle, according to the invention, as shown in FIG. 2, the synchronizing forces that occur can be optimally distributed on the synchronization systems for the splitter and range gear units so that now other parts such as bearings and gears in the transmission housing are optimized. The actuation devices, especially the pneumatic cylinders for shifting, and the supply that provides the power for these can be smaller so that saving in costs and weight, and a higher efficiency of the gear unit combined with improved comfort and low idle speed noise can be obtained.

The shifting cycle, according to the invention, provides that when shifting from the neutral position 0 to the coupling position 1 in timed sequence, first the range gear unit R, then the splitter unit S and finally the main gear unit H be shifted.

Figure 3A:
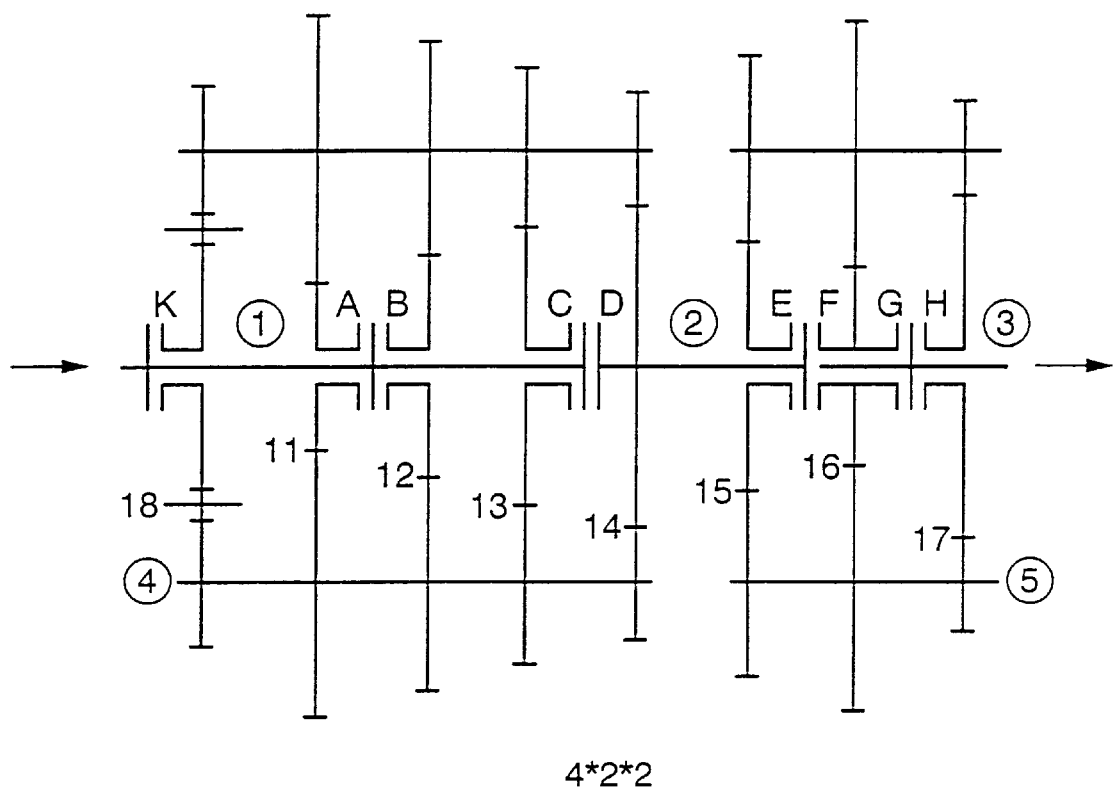
FIG. 3A is the gear diagram of the change gear unit.
Figure 3B:
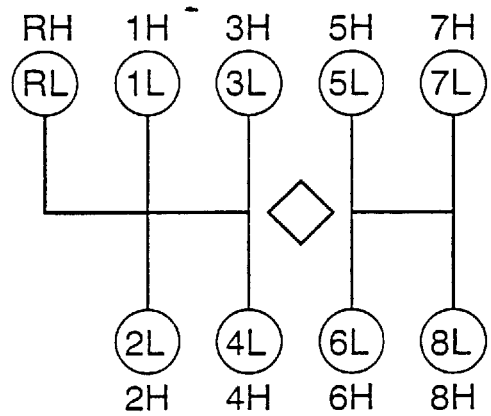
FIG. 3B is the appertaining shift gate.
Figure 4A:
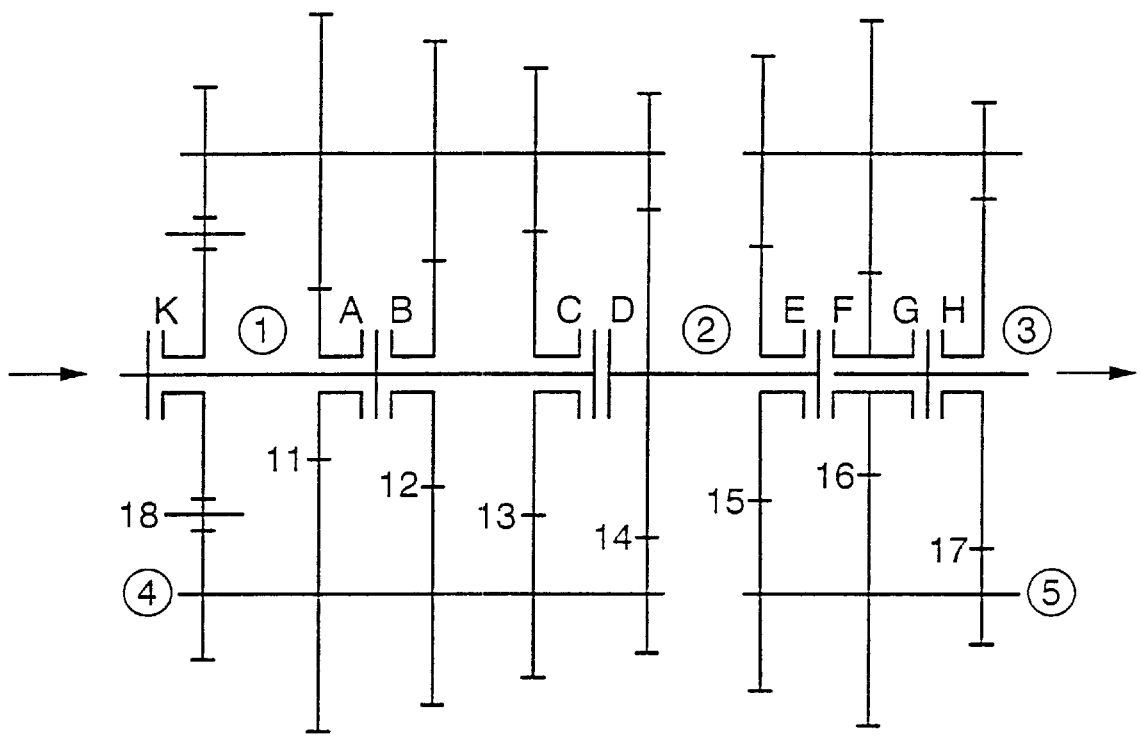
Figure 4B:
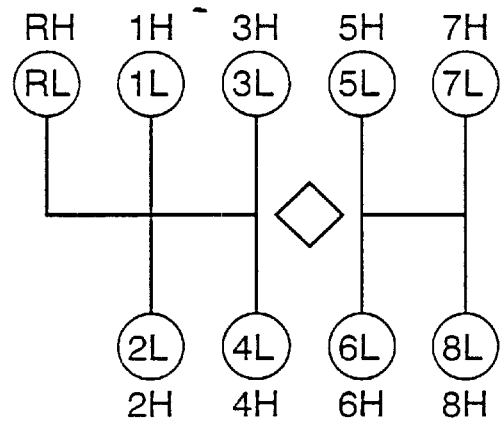

In an advantageous embodiment for applying the method, according to the invention, such as diagrammatically shown in FIGS. 3A–D and for the direct gear version and in FIGS. 4A–D and for the overdrive version. The shifting components A, B, C, D of the main gear unit, according to FIG. 3A, are situated directly upon the input shaft 1 which by the clutch K is connectable with the output shaft of the vehicle engine (not shown). The rotary masses to be synchronized are thus relatively small; besides, there is no shifting component and rotary mass to be synchronized in any ratio step that could have a mass increasing effect. Thereby small shifting forces and short shifting strokes are possible.

In the "idle speed" gear state, the splitter gear unit and the range gear unit can be engaged while the main gear unit is completely disengaged. Hereby no rotation irregularity of the engine can be introduced in the gear unit and thus idle speed rattle is prevented.

With the shifting cycle shown in FIG. 2, the loads acting upon the shifting components and thus the shifting time during shifting of the range gear unit R are considerably reduced.

In FIG. 3A, in addition, with E and F are designated the shifting components of the splitter gear unit, with G and H the shifting components of the range gear unit, with the input shaft 2 of the combination of splitter gear unit and range gear unit and with the output shaft 3 thereof; with two parallel countershafts 4 and 5 and with gears 11–17. With this arrangement can be shifted 4×2×2=16 forward gears, the shifting gate being diagrammatically shown in FIG. 3B while in FIG. 3C is indicated the individual ratio series for $i_{11}$ to $i_{18}$ and in FIG. 3D tabularly the shifting logic/total ratios; in the left column are shown the gears 1L, 1H, to 8L, 8H and both reverse gears RL and RH while in the top row are shown the shifting elements; the engaged state of which is shown by the X's; in the right column are shown the reduction ratios u.

FIGS. 3A to 3D refer to the direct gear version while FIGS. 4A to 4D, where is likewise diagrammatically shown the change gear unit for sixteen forward gears and two reverse gears, refers to the overdrive version. The difference from the direct gear version consists in that a ratio has another value, for example, the ratio of the spur gear step 15 ($i_{15}$).

We claim:

1. A method for changing the gears of a multiple gear manually shiftable change gear unit for commercial vehicles which has a main gear unit and downstream thereof a combination of splitter gear unit and range gear unit wherein the individual gear units are shifted from a coupling position (1) to a neutral position (0) in time such that first the main gear unit, thereafter the splitter gear unit and finally the range gear unit are shifted, wherein when shifting the gear units from the neutral position (0) to the coupling position (1), they are shifted in time such that first the range gear unit, then the splitter gear unit and finally the main gear unit is shifted.

2. The change gear unit for applying a method for changing the gears of a multiple gear manually shiftable change gear unit for commercial vehicles which has a main gear unit and downstream thereof a combination of splitter gear unit and range gear unit wherein the individual gear units are shifted from a coupling position (1) to a neutral position (0) in time such that first the main gear unit, thereafter the splitter gear unit and finally the range gear unit are shifted, wherein when shifting the gear units from the neutral position (0) to the coupling position (1), they are shifted in time such that first the range gear unit, then the splitter gear unit and finally the main gear unit is shifted, having a combination of splitter gear unit and range gear unit is located downstream in a direction of power transmission of a multiple gear main gear unit.

3. The change gear unit according to claim 2, wherein the shifting components of the main gear unit are situated directly upon an input shaft.

* * * * *